No. 871,121. PATENTED NOV. 19, 1907.
F. E. D'HUMY.
MASSAGE IMPLEMENT.
APPLICATION FILED FEB. 12, 1907.

UNITED STATES PATENT OFFICE.

FERNAND E. D'HUMY, OF ENGLEWOOD, NEW JERSEY.

MASSAGE IMPLEMENT.

No. 871,121.  Specification of Letters Patent.  Patented Nov. 19, 1907.

Application filed February 12, 1907. Serial No. 357,027.

*To all whom it may concern:*

Be it known that I, FERNAND E. D'HUMY, a citizen of the United States, residing at Englewood, in the county of Bergen and State of New Jersey, have invented certain new and useful Improvements in Massage Implements, of which the following is a specification.

This invention relates to massage implements and its object is to produce a combined pinching and pulling action resembling that of manual massage. According to my invention I produce this action through the medium of the pressure of the implement upon the skin. For this purpose the operative surface of the implement is preferably composed of a multiplicity of flexible rubber fingers or teeth predisposed to yield both toward and away from their neighbors when pressure is applied perpendicularly to the surface. The fingers may be arranged in parallel rows and slanted oppositely in adjacent rows.

Figure 1:
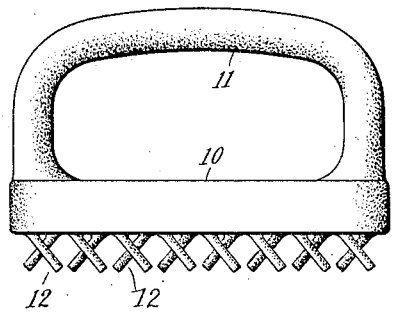
Figure 2:
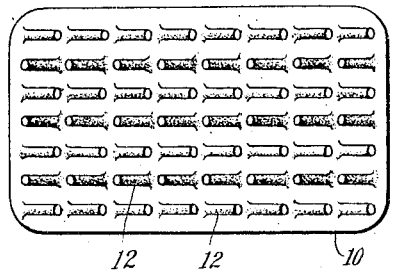
Figure 3:
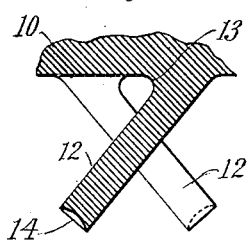
Figure 5:
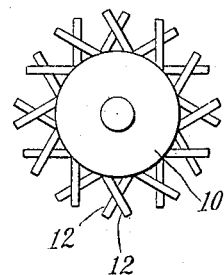
Figure 4:
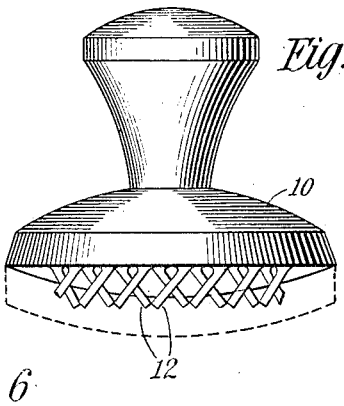
Figure 6:
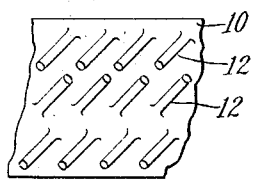
Figure 7:
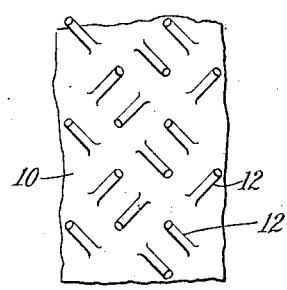

Of the accompanying drawings, Figures 1 and 2 represent respectively a side elevation and a plan view of one form of my improved massage implement and Fig. 3 represents an enlarged sectional view showing two of the fingers. Fig. 4 represents an elevation showing a modified circular or "puff" form. Fig. 5 represents an end view of a cylindrical form. Figs. 6 and 7 represent detail plan views illustrating two modified ways of slanting the fingers.

Referring to Figs. 1, 2, and 3, 10 is a suitable base of rectangular form provided with a handle 11 and with flexible rubber teeth 12, 12 projecting from its under face and arranged in parallel rectilinear rows, the fingers in one row all slanting in the same direction and the fingers in the adjacent row in the opposite direction and so on. The whole group of rubber fingers forms the operative surface of the implement. When the implement is pressed against a person's flesh in a direction perpendicular to this operative surface the rows of fingers tend to flatten out toward the base 10 and their free ends move in opposite directions by a species of snubbing action. Fingers whose ends approach each other will tend to gently pinch the flesh between them while fingers whose ends recede from each other will spread the flesh, and the combined action produces a stimulating massage.

The flexible fingers 12 may be molded on the base 10 or otherwise attached to or formed on said base by any suitable operation. At the root of each finger on its inner or overhanging side I prefer to form a fillet 13 merging with the base 10, for the purpose of strengthening the fingers to prevent rupture in withdrawing them from the mold when produced by a molding operation, and also to impart additional stiffness, tending to prevent the fingers from buckling when pressure is applied. Also each finger is preferably cupped or convexed at 14 on its free end to increase its adhesion to the skin.

Fig. 4 shows the implement in a circular puff-like form where the parallel rows of flexible rubber fingers 12 are arranged in concentric circles. A portion only of these fingers are shown but the general contour is indicated by dotted lines. Fig. 5 shows the base 10 in the form of a cylindrical roll with the oppositely-slanted flexible fingers 12 distributed around its surface in parallel circles. Many other modifications may be made in the form and contour of the operative surface.

Fig. 6 shows not only the fingers in each row slanted within the plane of the row, but the planes of the several rows slanted toward and from each other and from a perpendicular to the base. Fig. 7 indicates the same idea further carried out by placing the fingers of each row in two planes making a V, so that adjacent fingers in a row slant away from each other.

By way of summary it may be noted that among the chief characteristics which mark my improvement are the following: First, that the slanting fingers are mutiplied or repeated in both dimensions of length and breadth on the base so as to form a field or area of fingers the ends of which are both converging and diverging, whereby I produce the combined pinching and spreading action above described. Secondly, that the fingers are preferably made of a yielding material like soft rubber which gives a frictionally adhesive end, whether or not cupped as shown, is not so stiff as to injure the skin, will always resume its normal form after deformation, is sanitary, easily cleaned and non-corrosive, and may be easily and cheaply manufactured in the form of the article described.

I claim:—

1. A massage implement having an operative surface composed of a multiplicity of flexible slanting fingers distributed over a field or area, and having free ends both convergent and divergent so as to exert a combined pinching and spreading action when pressed upon the skin.

2. A massage implement comprising a base and a multiplicity of soft rubber fingers repeated in numerous rows in both dimensions so as to cover a field or area, and slanted in different directions to said base.

3. A massage implement comprising a base and a series of slanting rubber fingers thereon provided with free ends convexed to increase their adhesion to the skin.

4. A massage implement comprising a base and a series of slanting rubber fingers thereon having fillets on their inner sides at the roots.

In testimony whereof I have hereunto set my hand in the presence of two subscribing witnesses, the 11th day of February 1907.

FERNAND E. D'HUMY.

Witnesses:
R. M. PIERSON,
G. BLAKE.